US009086501B2

(12) United States Patent
Beer et al.

(10) Patent No.: US 9,086,501 B2
(45) Date of Patent: Jul. 21, 2015

(54) IMAGING, OBJECT DETECTION, AND CHANGE DETECTION WITH A POLARIZED MULTISTATIC GPR ARRAY

(71) Applicant: Lawrence Livermore National Security, LLC, Livermore, CA (US)

(72) Inventors: N. Reginald Beer, Pleasanton, CA (US); David W. Paglieroni, Pleasanton, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 213 days.

(21) Appl. No.: 13/748,417

(22) Filed: Jan. 23, 2013

(65) Prior Publication Data
US 2014/0226850 A1    Aug. 14, 2014

Related U.S. Application Data

(60) Provisional application No. 61/589,699, filed on Jan. 23, 2012.

(51) Int. Cl.
*G06K 9/00*  (2006.01)
*G01V 3/12*  (2006.01)
(Continued)

(52) U.S. Cl.
CPC . *G01V 3/12* (2013.01); *G01S 7/024* (2013.01); *G01S 7/295* (2013.01); *G01S 13/00* (2013.01); *G01S 13/003* (2013.01); *G01S 13/885* (2013.01); *G01S 13/90* (2013.01); *G06T 11/003* (2013.01)

(58) Field of Classification Search
USPC ......... 382/100, 103, 109, 128, 130, 131, 132; 378/4–27; 348/85; 73/152.01; 356/241.1
See application file for complete search history.

(56) References Cited

U.S. PATENT DOCUMENTS 5,796,363 A    8/1998   Mast
5,835,054 A   11/1998   Warhus et al.
(Continued)

FOREIGN PATENT DOCUMENTS

EP          0534730 A1    3/1993
JP        405087945 A     4/1993
(Continued)

OTHER PUBLICATIONS

U.S. Appl. No. 13/219,504, filed Aug. 26, 2011, Chambers et al.
(Continued)

*Primary Examiner* — Anand Bhatnagar
(74) *Attorney, Agent, or Firm* — Perkins Coie LLP

(57) ABSTRACT

A polarized detection system performs imaging, object detection, and change detection factoring in the orientation of an object relative to the orientation of transceivers. The polarized detection system may operate on one of several modes of operation based on whether the imaging, object detection, or change detection is performed separately for each transceiver orientation. In combined change mode, the polarized detection system performs imaging, object detection, and change detection separately for each transceiver orientation, and then combines changes across polarizations. In combined object mode, the polarized detection system performs imaging and object detection separately for each transceiver orientation, and then combines objects across polarizations and performs change detection on the result. In combined image mode, the polarized detection system performs imaging separately for each transceiver orientation, and then combines images across polarizations and performs object detection followed by change detection on the result.

20 Claims, 7 Drawing Sheets

(51) Int. Cl.

| | | |
|---|---|---|
| G06T 11/00 | (2006.01) | |
| G01S 13/00 | (2006.01) | |
| G01S 7/02 | (2006.01) | |
| G01S 7/295 | (2006.01) | |
| G01S 13/88 | (2006.01) | |
| G01S 13/90 | (2006.01) | |

(56) References Cited

U.S. PATENT DOCUMENTS

| | | | |
|---|---|---|---|
| 7,925,443 B2* | 4/2011 | Wahrmund et al. | 702/13 |
| 8,390,507 B2* | 3/2013 | Wintermantel | 342/70 |
| 8,436,763 B2* | 5/2013 | Wintermantel | 342/70 |
| 8,482,452 B2* | 7/2013 | Chambers et al. | 342/22 |
| 2007/0188371 A1 | 8/2007 | Callison | |
| 2008/0085033 A1* | 4/2008 | Haven et al. | 382/103 |
| 2010/0071955 A1* | 3/2010 | Benischek et al. | 175/50 |
| 2011/0080314 A1* | 4/2011 | Wintermantel | 342/147 |
| 2013/0082856 A1 | 4/2013 | Paglieroni et al. | |
| 2013/0082857 A1 | 4/2013 | Beer et al. | |
| 2013/0082858 A1 | 4/2013 | Chambers et al. | |
| 2013/0082859 A1 | 4/2013 | Paglieroni et al. | |
| 2013/0082860 A1 | 4/2013 | Paglieroni et al. | |
| 2013/0082861 A1 | 4/2013 | Paglieroni et al. | |
| 2013/0082862 A1 | 4/2013 | Paglieroni et al. | |
| 2013/0082863 A1 | 4/2013 | Paglieroni et al. | |
| 2013/0082864 A1 | 4/2013 | Paglieroni et al. | |
| 2013/0082870 A1 | 4/2013 | Chambers et al. | |
| 2013/0085982 A1 | 4/2013 | Paglieroni et al. | |
| 2014/0012505 A1* | 1/2014 | Smith | 702/2 |
| 2014/0219511 A1* | 8/2014 | Haddad | 382/109 |

FOREIGN PATENT DOCUMENTS

| | | |
|---|---|---|
| JP | 02002322610 A | 4/2001 |
| JP | 0201132853 A | 2/2011 |
| JP | 02012184624 A | 9/2012 |
| WO | WO2010-093426 A2 | 8/2010 |

OTHER PUBLICATIONS

U.S. Appl. No. 13/748,447, filed Jan. 23, 2013, Paglieroni et al.

Aliferis, I. et al., "Comparison of the diffraction stack and time-reversal imaging algorithms applied to short-range UWB scattering data," *Proc. IEEE Int. Conf. Ultra-Wideband*, Singapore, pp. 618-621, 2007.

Amman, H. et al., "Music-type electromagnetic imaging of a collection of small three-dimensional inclusions," *SIAM J. Sci. Comput.*, vol. 29, No. 2, pp. 674-709, 2007.

Ammari, H. et al., "A MUSIC algorithm for locating small inclusions buried in a half-space from the scattering amplitude at a fixed frequency," *Multiscale Model. Simul.*, vol. 3, No. 3, pp. 597-628, 2005.

Beer, N.R. et al., "Computational system for detecting buried objects in subsurface tomography images reconstructed from multistatic ultra wideband ground penetrating radar data," *LLNL-12311*, pp. 1-11, 2010.

Belkebir, K., Bonnard, S. et al., "Validation of 2D inverse scattering algorithms from multi-frequency experimental data," *J. Electromag. Waves App.*, vol. 14:1637-1667, 2000.

Bellomo, L. et al., "Time reversal experiments in the microwave range: description of the radar and results," *Prog. Electromag. Res.*, vol. 104, pp. 427-448, 2010.

Chambers, D.H., "Target characterization using time-reversal symmetry of wave propagation," *Int. J. Mod. Phys. B*, vol. 21, No. 20, pp. 3511-3555, 2007.

Chambers, D.H. and J.G. Berryman, "Analysis of the time-reversal operator for a small spherical scatterer in an electromagnetic field," *IEEE Trans. Ant. Prop.*, vol. 52, No. 7, pp. 1729-1738, 2004.

Chambers, D.H. and J.G. Berryman, "Target characterization using decomposition of the time-reversal operator: electromagnetic scattering from small ellipsoids," *Inv. Prob.*, vol. 22, pp. 2145-2163, 2006.

Chambers, D.H. and J.G. Berryman, "Time-reversal analysis for scatterer characterization," *Phys. Rev. Lett.*, vol. 92, No. 2, pp. 023902-1-023902-4, 2004.

Chan, K.P. and Y.S. Cheung, "Fuzzy-attribute graph with application to chinese character recognition," *IEEE Transactions on Systems, Man, and Cybernetics*, vol. 22, No. 1:153-160, Jan./Feb. 1992.

Chatelée, V. et al., "Real data microwave imaging and time reversal," *IEEE APS Int. Symp.*, pp. 1793-1796, 2007.

Chauveau, J. et al., "Determination of resonance poles of radar targets in narrow frequency bands," *Proc. 4th Euro. Radar Conf.*, Munich, pp. 122-125, 2007.

Cmielewski, O. et al., "A two-step procedure for characterizing obstacles under a rough surface from bistatic measurements," *IEEE Trans. Geos. Rem. Sens.*, vol. 45, No. 9, pp. 2850-2858, 2007.

Counts, T. et al., "Multistatic ground-penetrating radar experiments," *IEEE Trans. Geos. Rem. Sens.*, vol. 45, No. 8, pp. 2544-2553, 2007.

Cresp, A. et al., "Investigation of time-reversal processing for surface-penetrating radar detection in a multiple-target configuration," *Proc. 5th Euro. Radar Conf.*, Amsterdam, pp. 144-147, 2008.

Cresp, A. et al., "Time-domain processing of electromagnetic data for multiple-target detection," *Conf Math. Mod. Wave Phen.*, pp. 204-213, 2009.

Cresp, A. et al., "Comparison of the time-reversal and SEABED imaging algorithms applied on ultra-wideband experimental SAR data," *Proc. 7th Euro. Radar Conf.*, Paris, pp. 360-363, 2010.

Daniels, D.J., "Ground penetrating radar for buried landmine and IED detection," *Unexploded Ordnance Detection and Mitigation*, J. Byrnes (ed.), Springer, pp. 89-111, 2009.

Daniels, D.J., "A review of GPR for landmine detection," *Int. J. Sens. Imag.*, vol. 7, No. 3, pp. 90-123, 2006.

Daniels, D.J., "An assessment of the fundamental performance of GPR against buried landmines," *Detection and Remediation Technologies for Mines and Minelike Targets XII, Proc. SPIE*, vol. 6553, pp. 65530G-1-65530G-15, 2007.

Daniels, D.J. et al., "Classification of landmines using GPR," *IEEE Radar '08*, Proceedings, pp. 1-6, 2008.

Devaney, A.J., "Time reversal imaging of obscured targets from multistatic data," *IEEE Trans. Ant. Prop.*, vol. 53, No. 5, pp. 1600-1619, May 2005.

Dubois, A. et al., "Localization and characterization of two-dimensional targets buried in a cluttered environment," *Inv. Prob.*, vol. 20, pp. S63-S79, 2004.

Dubois, A. et al., "Retrieval of inhomogeneous targets from experimental frequency diversity data," *Inv. Prob.*, vol. 21, pp. S65-S79, 2005.

Dubois, A. et al., "Imaging of dielectric cylinders from experimental stepped frequency data," *Appl. Phys. Lett.*, vol. 88, pp. 64104-1-164104-3, 2006.

Feng, X. and M. Sato, "Pre-stack migration applied to GPR for landmine detection," *Inv. Prob.*, vol. 20, pp. S99-S115, 2004.

Fink, M. et al., "Time-reversed acoustics," *Rep. Prog. Phys.*, vol. 63:1933-1995, 2000.

Fink, M. and C. Prada, "Acoustic time-reversal mirrors," *Inv. Prob.*, vol. 17, pp. R1-R38, 2001.

Gader, P. et al., "Detecting landmines with ground-penetrating radar using feature-based rules, order statistics, and adaptive whitening," *Trans. Geos. Rem. Sens.*, vol. 42, No. 11, pp. 2522-2534, 2004.

Gaunaurd, G.C. and L.H. Nguyen, "Detection of land-mines using ultra-wideband radar data and time-frequency signal analysis," *IEE Proc. Radar Sonar Navig.*, vol. 151, No. 5, pp. 307-316, 2004.

Gilmore, C. et al., "Derivation and comparison of SAR and frequency-wavenumber migration within a common inverse scalar wave problem formulation," *IEEE Trans. Geos. Rem. Sens.*, vol. 44, No. 6, pp. 1454-1461, 2006.

Grove, A.J. et al., "General convergence results for linear discriminant updates," *Proc. COLT 97*, ACM press, pp. 171-183, 1997.

Iakovleva, E. et al., "Multistatic response matrix of a 3-D inclusion in half space and MUSIC imaging," *IEEE Trans, Ant. Prop.*, vol. 55, pp. 2598-2607, 2007.

Iakovleva, E. and D. Lesselier, "Multistatic response matrix of spherical scatterers and the back propagation of singular fields," *IEEE Trans. Ant. Prop.*, vol. 56, No. 3, pp. 825-833, 2008.

(56) References Cited

OTHER PUBLICATIONS

Jofre, L. et al., "UWB tomographic radar imaging of penetrable and impenetrable objects," *Proc. IEEE*, vol. 97, No. 2, pp. 451-464, 2009.

Kuhn, H.W., "The Hungarian method for the assignment problem," *Naval Research Logistics Quarterly*, 2:83-97, 1955.

Lee, W-H. et al., "Optimizing the area under a receiver operating characteristic curve with application to landmine detection," *IEEE Trans. Geos. Rem. Sens.*, vol. 45, No. 2, pp. 389-397, 2007.

Mast, J.E. and E.M. Johansson, "Three-dimensional ground penetrating radar imaging using multi-frequency diffraction tomography," *SPIE*, vol. 2275, pp. 196-204, 1994.

Johansson, E.M. and J. Mast, "Three-dimensional ground penetrating radar imaging using synthetic aperture time-domain focusing," *SPIE*, vol. 2275, pp. 205-214, 1994.

Micolau, G. and M. Saillard, "DORT method as applied to electromagnetic subsurface imaging," *Radio Sci.*, vol. 38, No. 3, 1038, pp. 4-1-4-12, 2003.

Micolau, G. et al., "DORT method as applied to ultrawideband signals for detection of buried objects," *IEEE Trans. Geos. Rem. Sens.*, vol. 41, No. 8, pp. 1813-1820, 2003.

Mueller, R. et al., "Image Registration and Change Detection Feasibility Study with Ground Penetrating Radar," *Proc. of SPIE* 8357:83571Y-1-83571Y-9, 2012.

Orlin, J.B. and R.K. Ahuja, "New Scaling Algorithms for the Assignment and Minimum Mean Cycle Problems," *Mathematical Programming*, vol. 54, pp. 41-56, 1992.

Paglieroni, D. and F. Nekoogar, "Matching random tree models of spatio-temporal patterns to tables or graphs," *IEEE Symposium on Computational Intelligence and Data Mining*, pp. 1-8, Apr. 1-5, 2007.

Paglieroni, D., and K. Ni "DART Queries," *IEEE Transactions on Knowledge and Data Engineering*, in Revision, LLNL-JRNL-418760, 2010.

Paglieroni, D.W. et al., "DART-based threat assessment for buried objects Detected with a ground penetrating radar over time," LLNL, pp. 1-7, 2010.

Prada, C. and M. Fink, "Eigenmodes of the time reversal operator: A solution to selective focusing in multiple-target media," *Wave Motion*, vol. 20, pp. 151-163, 1994.

Ranade, S. et al., "Point Pattern Matching by Relaxation," *Pattern Recognition* 12:169-275, 1980.

Saillard, M. et al., "Reconstruction of buried objects surrounded by small inhomogeneities," *Inv. Prob.*, vol. 16, pp. 1195-1208, 2000.

Soumekh, M. et al., "3D wavefront image formation for NIITEK GPR," *Radar Sensor Technology XIII Proc. SPIE*, vol. 7308, pp. 73080J-1-73080J-12, 2009.

Sternlicht, D.D. et al., "Advances in Seabed Change Detection for Port and Coastal Security," *WSS Conference*, May 2012, 6 pages.

Throckmorton, C. et al., "The efficacy of human observation for discrimination and feature identification of targets measured by the NIITEK ground penetrating radar," *Detection and Remediation Technologies for Mines and Minelike Targets IX, Proc. SPIE*, vol. 5415, pp. 963-972, 2004.

Torrione, P.A. et al., "Performance of an adaptive feature-based processor for a wideband ground penetrating radar system," *IEEE Trans. Aerospace Elec. Systems*, pp. 1-10, 2006.

Torrione, P.A. and L.M. Collins, "Texture features for antitank landmine detection using ground penetrating radar," *IEEE Trans. Geos. Rem. Sens.*, vol. 45, No. 7, pp. 2374-2382, 2007.

Torrione, P.A. et al., "Constrained filter optimization for subsurface landmine detection," *Detection and Remediation Technologies for Mines and Minelike Targets XI, Proc. SPIE*, vol. 6217, pp. 621710X-1-621710X-12, 2006.

Torrione, P.A., Collins, L. et al., "Application of the LMS algorithm to anomaly detection using the Wichmann/NIITEK ground penetrating radar," *Detection and Remediation Technologies for Mines and Minelike Targets VIII, Proc. SPIE*, vol. 5089, pp. 1127-1136, 2003.

Tortel, H. et al., "Decomposition of the time reversal operator for electromagnetic scattering," *J. Electromag. Waves. App.*, vol. 13, pp. 687-719, 1999.

Tsai, W-H and K-S Fu, Error-Correcting Isomorphisms of Attributed Relational Graphs for Pattern Analysis, *IEEE Transactions on Systems, Man, and Cybernetics*, vol. 9, No. 12, pp. 757-768, 1979.

Vitebskiy, S., Carin, L., "Resonances of perfectly conducting wires and bodies of revolution buried in a lossy dispersive half-space," *IEEE Trans. Ant. Prop.*, vol. 44, No. 12, pp. 1575-1583, 1996.

Vitebskiy, S. et al., "Short-pulse plane-wave scattering from buried perfectly conducting bodies of revolution," *IEEE Trans. Ant. Prop.*, vol. 44, No. 2, pp. 143-151, 1996.

Wilson, J.N. et al., "A large-scale systematic evaluation of algorithms using ground-penetrating radar for landmine detection and discrimination," *IEEE Trans. Geos. Rem. Sens.*, vol. 45, No. 8, pp. 2560-2572, 2007.

Yavuz, M.E. and F.L. Teixeira, "Full time-domain DORT for ultrawideband electromagnetic fields in dispersive, random inhomogeneous media," *IEEE Trans. Ant. Prop.*, vol. 54, No. 8, pp. 2305-2315, 2006.

Yavuz, M.E. and F.L. Teixeira, "On the sensitivity of time-reversal imaging techniques to model perturbations," IEEE Trans. Ant. Prop., vol. 56, No. 3, pp. 834-843, 2008.

Yavuz, M.E. and F.L. Teixeira, "Space-frequency ultrawideband time-reversal imaging," IEEE Trans. Geos. Rem. Sens., vol. 46, No. 4, pp. 1115-1124, 2008.

Zhu, Q. and L.M. Collins, "Application of feature extraction methods for landmine detection using the Wichmann/NIITEK ground-penetrating radar," IEEE Trans. Geos. Rem. Sens., vol. 43, No. 1, pp. 81-85, 2005.

Zhuge, X. et al., "UWB array-based radar imaging using modified Kirchhoff migration," *Proc. 2008 IEEE Conf. Ultra-Wideband*, vol. 3, pp. 175-178, 2008.

\* cited by examiner

IMAGING, OBJECT DETECTION, AND CHANGE DETECTION WITH A POLARIZED MULTISTATIC GPR ARRAY

CROSS-REFERENCE TO RELATED APPLICATION(S)

This application claims the benefit of U.S. Provisional Patent Application No. 61/589,699, filed Jan. 23, 2012, entitled "DART-BASED DETECTION AND DISCRIMINATION UTILIZING WAVE POLARIZATION AND OBJECT ORIENTATION," which is incorporated herein by reference in its entirety.

This application is related to U.S. patent application Ser. No. 13/219,410, filed Aug. 26, 2011 and entitled "REAL-TIME SYSTEM FOR IMAGING AND OBJECT DETECTION WITH A MULTISTATIC GPR ARRAY;" and U.S. patent application Ser. No. 13/748,447, filed concurrently and entitled "POINT PATTERN MATCH-BASED CHANGE DETECTION IN A CONSTELLATION OF PREVIOUSLY DETECTED OBJECTS," which are incorporated herein by reference in their entirety.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Many scientific, engineering, medical, and other technologies seek to identify the presence of an object within a medium. For example, some technologies detect the presence of buried landmines in a roadway or a field for military or humanitarian purposes. Such technologies may use ultra wideband ground-penetrating radar ("GPR") antennas that are mounted on the front of a vehicle that travels on the roadway or across the field. The antennas are directed into the ground with the soil being the medium and the top of the soil or pavement being the surface. GPR systems can be used to detect not only metallic objects but also non-metallic objects whose dielectric properties are sufficiently different from those of the soil. When a radar signal strikes a subsurface object, it is reflected back as a return signal to a receiver. Current GPR systems typically analyze the strength or amplitude of the return signals directly to identify the presence of the object. Some GPR systems may, however, generate tomography images from the return signals. In the medical field, computer-assisted tomography uses X-rays to generate tomography images for detecting the presence of abnormalities (i.e., subsurface objects) within a body. In the engineering field, GPR systems have been designed to generate spatial images of the interior of concrete structures such as bridges, dams, and containment vessels to assist in assessing the integrity of the structures. In such images, the subsurface objects represented by such images tend to appear as distinct bright spots. In addition to referring to a foreign object that is within a medium, the term "object" also refers to any characteristic of the medium (e.g., crack in the medium and change in medium density) that is to be detected.

Using current imaging techniques, computational systems attached to arrays that contain dozens of antennas are unable to produce radar tomography images of the subsurface in real time. A real-time system needs to process the return signals from successive sampling locations of the vehicle as it travels so that, in the steady state, the return signals for one sampling location are processed within the time between samplings. Moreover, in the case of a vehicle that detects landmines, a real-time system may need to detect the presence of the landmine in time to stop the vehicle from hitting the landmine.

Some current technologies seek to detect the presence of new objects that were not detected in previous passes. For example, a convoy of military vehicles may travel over a certain roadway fairly often. If access to the roadway is not tightly controlled, the military may need to check, each time a convoy is to travel down the roadway, for the presence of landmines or other objects that may pose a hazard to the convoy. As another example, a civil engineering firm may check bridges, dams, and other structures on a regular basis (e.g., yearly) for the presence of new subsurface defects (e.g., cracks). Each time the structure, roadway, or area is scanned, large amounts of data may be collected and processed. For example, the scan of the roadway may collect GPR return signals every few centimeters. GPR systems may generate image frames from the return signals and detect subsurface objects in those image frames. When these GPR systems have access to data from previous scans of that structure or roadway, the GPR systems may detect change by comparing (i) images reconstructed along the latest scan to images reconstructed along previous scans, or (ii) newly detected objects to previously detected objects.

Current GPR systems do not use results from previous scans to perform change detection for objects in real time. A major hurdle in achieving this goal is that the cost of storing the vast amounts of data collected from previous scans and comparing data from those previous scans to the latest scan may be prohibitive. A real-time system needs to process the return signals from successive sampling locations of the vehicle down-track so that, in the steady state, the return signals for one sampling location are processed within the time between samplings. Moreover, in the case of a vehicle that detects landmines, a real-time system may need to detect the presence of the landmine in time to stop the vehicle that is collecting the return signals before it hits the landmine.

Current GPR systems may use several transmitter and receiver antenna pairs that are typically oriented in the same direction. For example, an array of transmitter and receiver pairs may be mounted in a linear array on a vehicle with the antennas oriented across the roadway, that is, perpendicular to the direction of the roadway. Transmitters oriented across the roadway emit a signal that is polarized across the roadway. The return signals from such transmitters are strongest when a subsurface object has a significant extent across the roadway. For example, an object that extends across one-quarter of the roadway will produce a return signal that is much stronger than an object that extends only a very short distance across the roadway. Thus, a large boulder or a pipeline crossing the roadway will produce a strong return signal, but a pipeline that extends in the direction of the roadway will produce a much weaker return signal. As a result, such GPR systems may produce results that are less than desirable for objects (e.g., cracks or pipelines) with a short extent across the roadway. Although some GPR systems use antenna arrays with transmitters and receivers with different orientations, these systems do not effectively detect subsurface objects in real time.

DETAILED DESCRIPTION

Figure 1:
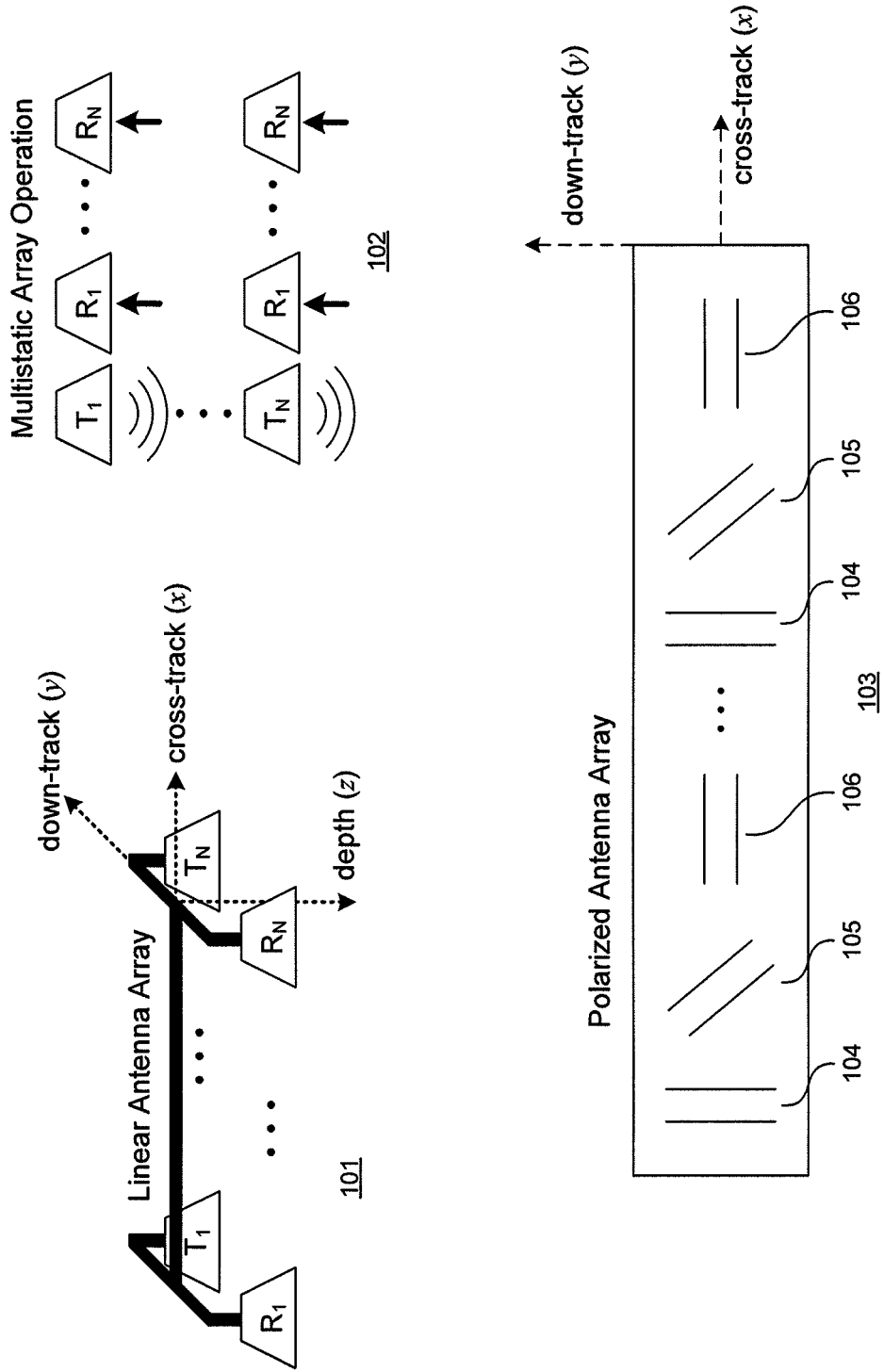
FIG. 1 is a diagram that illustrates an arrangement of a linear array of antennas.

A method and system for detecting the presence of subsurface objects within a medium is provided. In some embodiments, the polarized detection system performs imaging, object detection, and change detection factoring in the orientation of an object relative to the orientation of transceivers. The polarized detection system may operate in a multistatic mode by using radar return signals associated with transmitter/receiver pairs within an array of transmitter and receiver antennas. For example, when the polarized detection system is used on a roadway (or more generally a track), the array of transceiver antenna pairs may be mounted on a vehicle that travels down the roadway. Each transceiver antenna pair is associated with a location across the roadway, and the transceiver antenna pairs transmit signals and receive return signals at the various sampling locations down the roadway. The transceiver antenna pairs have different orientations relative to the roadway. For example, in an array with 12 transceiver antenna pairs, three sets of four transceiver antenna pairs may be oriented at angles of 0, 45, and 90 relative to the direction of travel. The polarized detection system pre-processes return signals to suppress the effects of extraneous signals such as antenna coupling, external interference, surface bounce and multipath, surface roughness, and so on. After preprocessing the return signals, the polarized detection system generates reconstructed images for the sampling locations. The reconstructed images represent an image of the subsurface that extends across the medium for the length of the array of transceiver antenna pairs and to a certain depth. To generate the reconstructed images, the polarized detection system generates a real aperture radar tomography image for each sampling location using plane-to-plane backward propagation. The polarized detection system then generates a synthetic aperture radar image representing the reconstructed image for a sampling location based on a sequence of real aperture radar images at nearby sampling locations along the track. The polarized detection system then post-processes the reconstructed images to assist in improving the detection of objects. The polarized detection system may subtract out various mean values from the pixel values of the reconstructed images, apply various filters, and enhance the energy of a spot within the reconstructed images. The polarized detection system may generate a detection statistic for each pre-processed image. For example, the detection statistic may be based on the total energy of the dominant spot within a post-processed image. The polarized detection system considers the detection statistic as a time-varying signal with an amplitude corresponding to the time of each sampling along the track. The peaks within the detection statistic time series indicate subsurface objects. The polarized detection system then applies a peak filtering detection algorithm within the detection statistics to identify the presence of a subsurface object at a specific cross-track and down-track location. Although the polarized detection system is described primarily for processing ground-penetrating radar data to detect buried objects (e.g., landmines, pipes, and rocks), the polarized imaging and detection system has many other applications, such as in the civil engineering and medical fields, and may use signals other than electromagnetic signals, such as acoustic signals.

In some embodiments, the polarized detection system applies attribute- and topology-based change detection to networks of objects that were detected on previous scans of a structure, roadway, or area of interest. The attributes capture properties or characteristics of the previously detected objects, such as location, time of detection, size, elongation, orientation, etc. The topology of the network of previously detected objects (the geometrical structure of the network in xyz space) is maintained in a constellation database that stores attributes of previously detected objects and implicitly captures the geometrical structure of the network. The polarized detection system sets the attributes of the objects based in part on the orientation of the objects relative to transceiver orientation. In some embodiments, the polarized detection system performs change detection by comparing the attributes and topology of new objects detected on the latest scan to the constellation database of previously detected objects. The polarized detection system maintains a constellation database that contains aggregate information, including aggregate values of attributes over prior instances of specific objects that were detected in scans prior to the latest scan. When the polarized detection system receives information on newly detected objects on the latest scan, it evaluates how well the newly detected objects correspond to previously detected objects topologically and in terms of attributes. The polarized detection system initially selects a previously detected object that appears to correspond to a newly detected object (in the sense that they topologically appear to be the same object) using a spatial network correspondence algorithm. Such a topological correspondence is referred to as the "root correspondence." The polarized detection system evaluates the degree of correspondence between other newly detected objects and other previously detected objects in the vicinity based on this correspondence. The correspondence algorithm may, for example, select a previously detected object and a newly detected object that are topologically consistent and have similar attributes. Once the polarized detection system selects a pair of newly and previously detected objects as the correspondence, it calculates a "cost factor" associated with pairs of other newly and previously detected objects in the vicinity of the correspondence. This cost factor reflects the belief that the newly detected object corresponds to the previously detected object of that pair. For example, a low cost factor may indicate that the objects more likely correspond. The polarized detection system may then generate a change statistic for each newly detected object to quantify the belief that it might not have been previously detected (and thus constitute a change). For example, a large change statistic value may indicate that the newly detected object is more likely to have never been detected on any previous scan. The polarized detection system may compute the change statistic using a cost factor (based on attributes and topological consistency) for assigning that object to the previously detected object that it corresponds to. The polarized detection system may determine a likely correspondence between previously and newly detected objects using a minimal cost assignment algorithm applied to spatially localized sets of previously and newly detected objects. After determining the optimal correspondence, the polarized detection system updates information in the constellation database of previously detected objects with the values of the attributes of the corresponding newly detected objects, as these attributes may vary over time due to variations in scan path (e.g., direction of travel or closeness to the center of the roadway), changes in the surface (e.g., ruts in the roadway after a rainstorm), and so on. If a newly detected object corresponds to no previously detected object, then it may constitute a change. If so, the polarized detection system adds that object as an additional object to the constellation database, and it will be treated as a previously detected object by subsequent scans.

In some embodiments, the polarized detection system employs a linear array of transmitter and receiver antennas for transmitting and receiving radar signals. For example, the linear array may consist of 12 transmitters $T_i$ and 12 receivers $R_j$ with each transmitter $T_k$ and receiver $R_k$ organized into a transceiver pair. The transceivers are equally spaced across the linear array. Each transceiver has a transceiver orientation $\theta_t$ relative to the direction of travel. FIG. 1 is a diagram that illustrates an arrangement of a linear array of antennas. The linear array may be moved across a stationary surface or may be stationary with the surface moving. For example, the linear array may be mounted on a vehicle that is driven on a road to detect buried objects or may be a stationary part of a medical device in which a patient is moved under the linear array. The linear array moves in a down-track (or y) direction relative to the surface, the linear array is oriented in a cross-track (or x) direction, and the linear array transmits signals in the depth (or z) direction. For example, when a linear array is mounted on a vehicle traveling on a road, the down-track is the direction of travel, the cross-track is the direction across the road, and the depth is the direction into the road. As shown in the linear array 101, the transmitter and receiver $T_iR_i$ associated with a given transceiver are located at substantially the same cross-track location. The linear array has two modes of operation: multi-monostatic and multistatic. In monostatic mode, the signal transmitted by a transmitter is received only by the receiver of that same transceiver. The multi-monostatic mode refers to the operation of multiple transceivers of a linear array that each operate in the monostatic mode in sequence. When in multi-monostatic mode, at each down-track or sampling location, the polarized detection system activates the transmitters of each transceiver in sequence across the track and collects the return signal only at the corresponding receiver of that transceiver. The polarized detection system thus collects one return signal for each transceiver at each down-track location. The multistatic mode refers to the operation of multiple transceivers of a linear array in which each transmitter transmits in sequence, but the return signal is collected by multiple receivers with the same orientation. When in multistatic mode, at each down-track location, for each transceiver orientation, the polarized detection system activates the transmitter of each transceiver with that orientation in sequence and collects the return signal from all the receivers with the same transceiver orientation, as illustrated in diagram 102. If the linear array has N transceivers for each transceiver orientation, then the imaging and detection system collects N return signals in multi-monostatic mode and $N^2$ return signals in multistatic mode for each transceiver orientation. Diagram 103 illustrates the orientation of the transceivers. In this example, transceivers 104, 105, and 106 are oriented at an angle 0 degrees, 45 degrees, and 90 degrees relative to the direction of travel. In some embodiments, the array of transceivers may not be linear or may be organized into a grid of transceivers.

In some embodiments, the polarized detection system performs imaging and object detection as described in U.S. patent application Ser. No. 13/219,410, filed Aug. 26, 2011, entitled "REAL-TIME SYSTEM FOR IMAGING AND OBJECT DETECTION WITH A MULTISTATIC GPR ARRAY" factoring in transceiver orientation. For example, the polarization generates a separate image for each down-track location for each transceiver orientation. The polarized detection system performs change detection as described in U.S. patent application Ser. No. 13/748,447, filed concurrently and entitled "CONSTELLATION MATCHING BASED CHANGE DETECTION IN A CONSTELLATION OF PREVIOUSLY DETECTED OBJECTS" factoring in transceiver orientation. The polarized detection system may use one of several modes of operation based on whether changes, objects, or images are combined across polarizations. In combined change mode, the polarized detection system performs imaging, object detection, and change detection separately for each transceiver orientation, and then combines changes across polarizations. In combined object mode, the polarized detection system performs imaging and object detection separately for each transceiver orientation, and then combines objects across polarizations and performs change detection on the result. In combined image mode, the polarized detection system performs imaging separately for each transceiver orientation and then combines images across polarizations and performs object detection followed by change detection on the result.

In combined change mode, the polarized detection system performs separate imaging, objection detection, and change detection for each transceiver orientation from the return signals of the transceivers with that transceiver orientation. The polarized detection system then indicates that a change has been detected by invoking a rule for combining change across multiple antenna polarizations. For example, if a change is indicated for any transceiver orientation, the polarized detection system may indicate that a change has occurred. Alternatively, the polarized detection system may indicate a change only when a change is indicated for a transceiver orientation that is closely aligned with the object.

In combined object mode, the polarized detection system performs separate imaging and object detection for each transceiver orientation, generates combined objects, and then applies change detection to the combined objects. When corresponding objects are detected for different transceiver orientations, the polarized detection system generates combined objects by setting the attributes of the objects based on a weighted average of the separate attributes for that object at the various transceiver orientations. The polarized detection system weights the attributes based on the difference between the transceiver orientation and the object orientation with a difference of 0 degrees having the highest weight and a difference of 90 degrees having the lowest weight. The polarized detection system supplies the combined objects to the change detection system to detect changes in the combined objects.

In combined image mode, the polarized detection system performs separate imaging for each transceiver orientation for each down-track location, generates combined images, and applies object detection and change detection to the combined images. To generate a combined image for a down-track location, the polarized detection system identifies the orientation of an object within the images and sets the pixels corresponding to the object as a weighted average of the corresponding pixels in the separate images. The polarized detection system weights the pixels based on the difference between the transceiver orientation and the object orientation.

Figure 2:
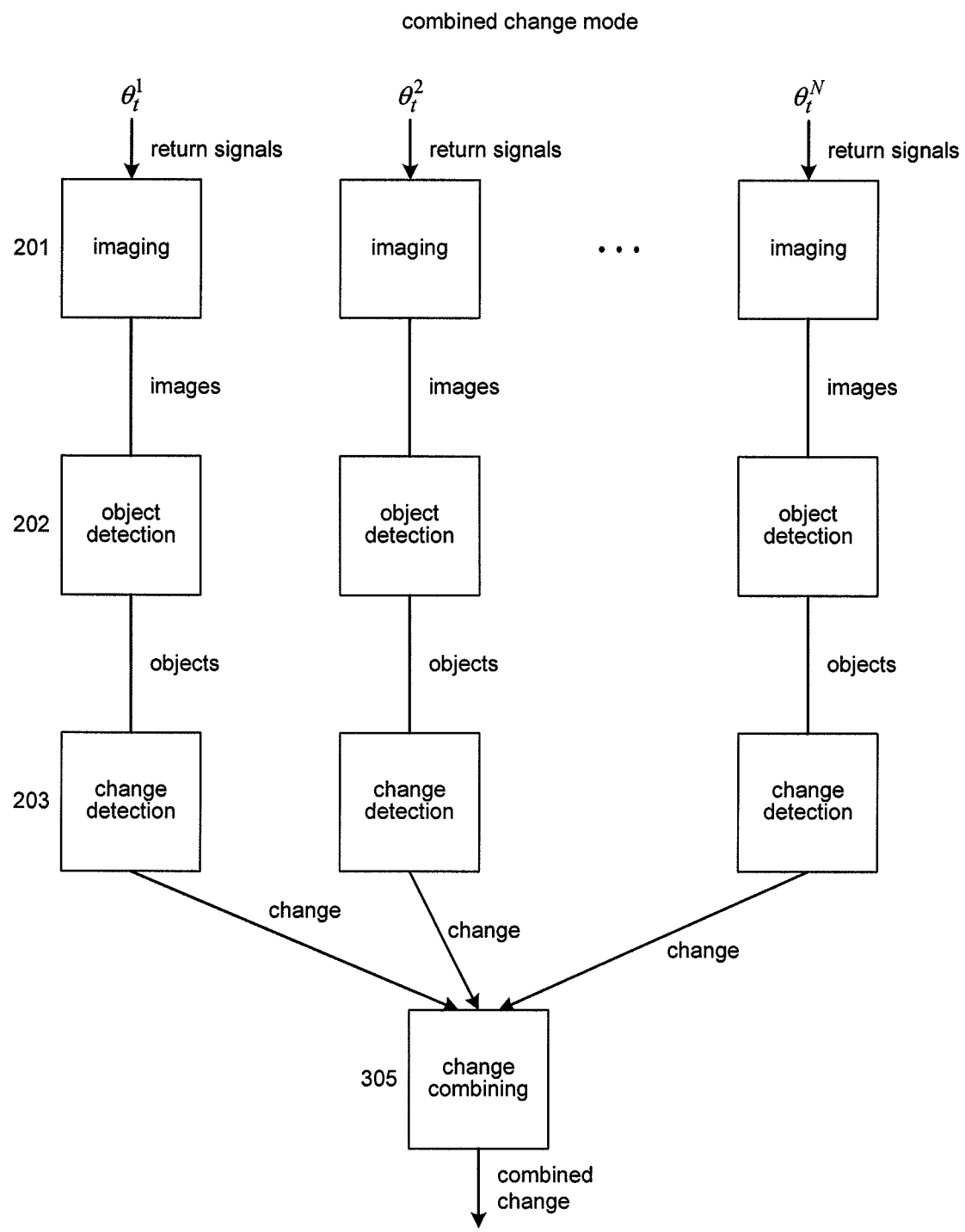
FIG. 2 is a block diagram that illustrates the combined change mode in some embodiments of the polarized detection system.

FIG. 2 is a block diagram that illustrates the combined change mode in some embodiments of the polarized detection system. In the combined change mode, the polarized detection system performs separate imaging 201, object detection 202, and change detection 203 for each transceiver orientation $\theta_t$. For each transceiver orientation $\theta_t$, the polarized detection system receives return signals collected by receivers at orientation $\theta_t$ and outputs images. For each transceiver orientation, the polarized detection system separately performs object detection on the images and change detection on the objects output by the change detection system. The polarized detection system performs change combining 204 based on the indications of change at separate polarizations, and outputs a combined indication of change.

Figure 3:
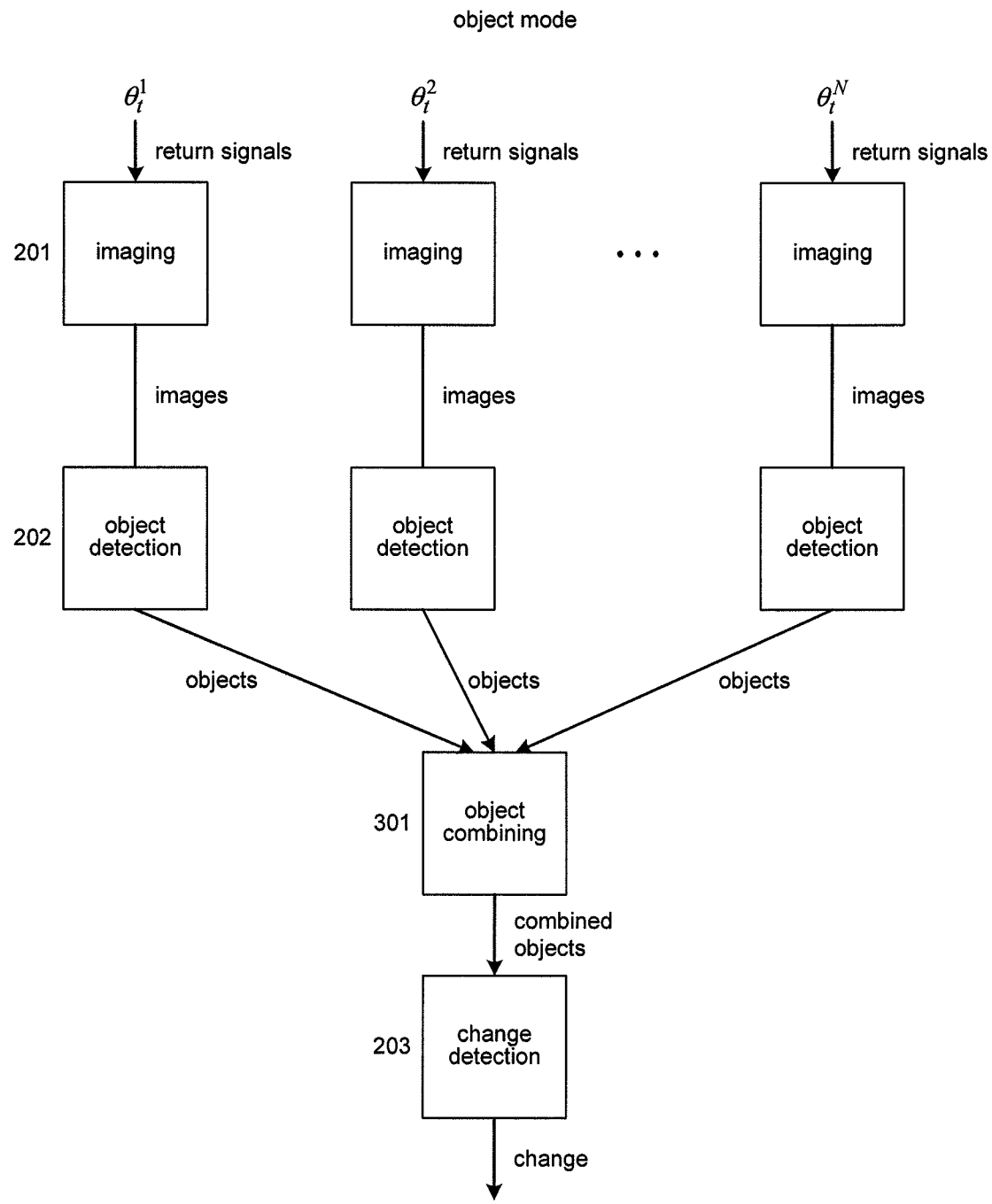
FIG. 3 is a block diagram that illustrates the combined object mode in some embodiments of the polarized detection system.

FIG. 3 is a block diagram that illustrates the combined object mode in some embodiments of the polarized detection system. In combined object mode, the polarized detection system performs separate imaging 201 and object detection 202 for each transceiver orientation. For each transceiver orientation $\theta_t$ the polarized detection system receives return signals collected by receivers at orientation $\theta_t$ and outputs images. For each transceiver orientation, the polarized detection system separately performs object detection on the images and outputs separate objects. The polarized detection system performs object combining 301 on the separate objects and outputs the combined objects. The polarized detection system then performs change detection 203 on the combined objects and outputs an indication of any change.

Figure 4:
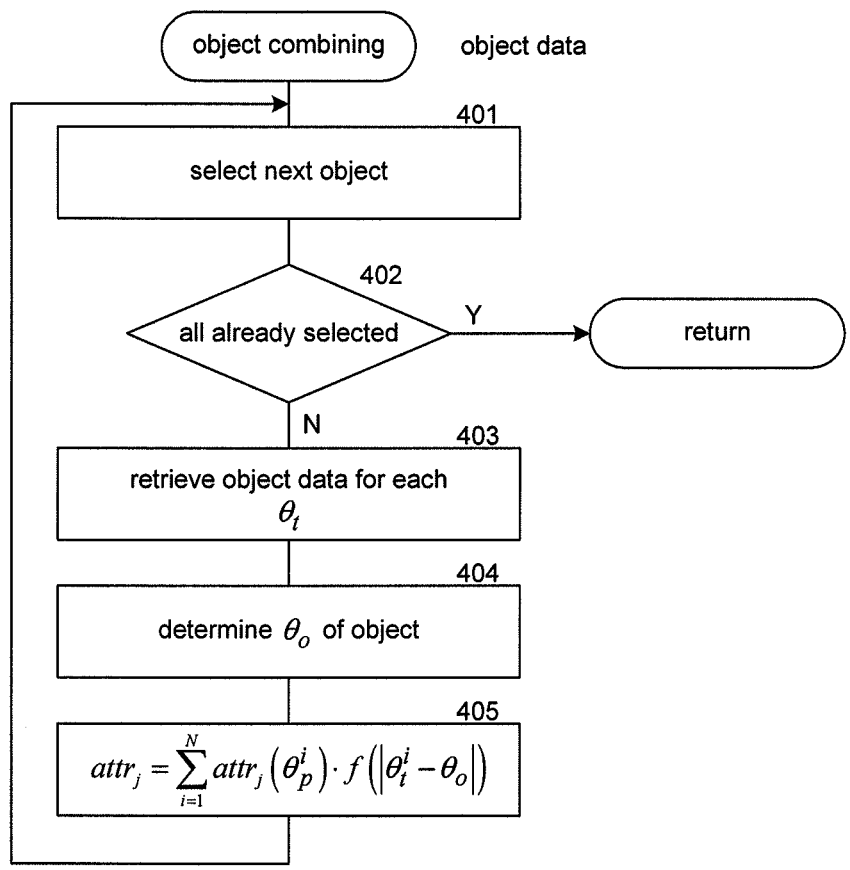
FIG. 4 is a flow diagram that illustrates the processing of an object combining component of the polarized detection system in some embodiments.

FIG. 4 is a flow diagram that illustrates the processing of an object combining component of the polarized detection system in some embodiments. The component receives the object data for multiple transceiver orientations and generates combined objects by combining the attributes of the object. The attributes may include any attribute used when performing change detection. These attributes may include strength of detection, location, length, and so on. In block 401, the component selects the next object. In decision block 402, if all the objects have already been selected, then the component completes, else the component continues at block 403. In block 403, the component retrieves the object data for the selected object for each transceiver orientation. In block 404, the component determines the object orientation $\theta_o$ of the object. In block 405, the component generates a weighted average of each attribute of the object according to the following equation:

$$attr_j = \sum_{i=1}^{N} attr_j(\theta_p^i) \cdot f(|\theta_t^i - \theta_o|) \quad (1)$$

where $attr_j$ represents the combined data for the jth attribute, $attr_j(\theta_t^i)$ represents the data for the jth attribute for the ith transceiver orientation, and $f$ represents a weighting function that generates the weight for a transceiver orientation. The weighting function inputs the difference between the transceiver orientation and the object orientation and outputs a number between 0 and 1. In some embodiments, the weighting function may be a linear function that maps a difference of 0 degrees to 1 and a difference of 90 degrees to 0. Alternatively, the weighting function may be based on the cosine of the difference as represented by the following equation:

$$f(\Delta_\theta) = |\cos^n \Delta_\theta| \quad (2)$$

where $\Delta_\theta$ represents the difference in transceiver orientation and object orientation and n represents a scaling factor. In general, the weighting function $f(\Delta_\theta)$ is continuous, varies from zero to one, is zero for $\Delta_\theta = (k+1)\pi/2$ and one for $\Delta_\theta = k\pi$ (where k is an integer). The component then loops to block 401 to select the next object.

Figure 5:
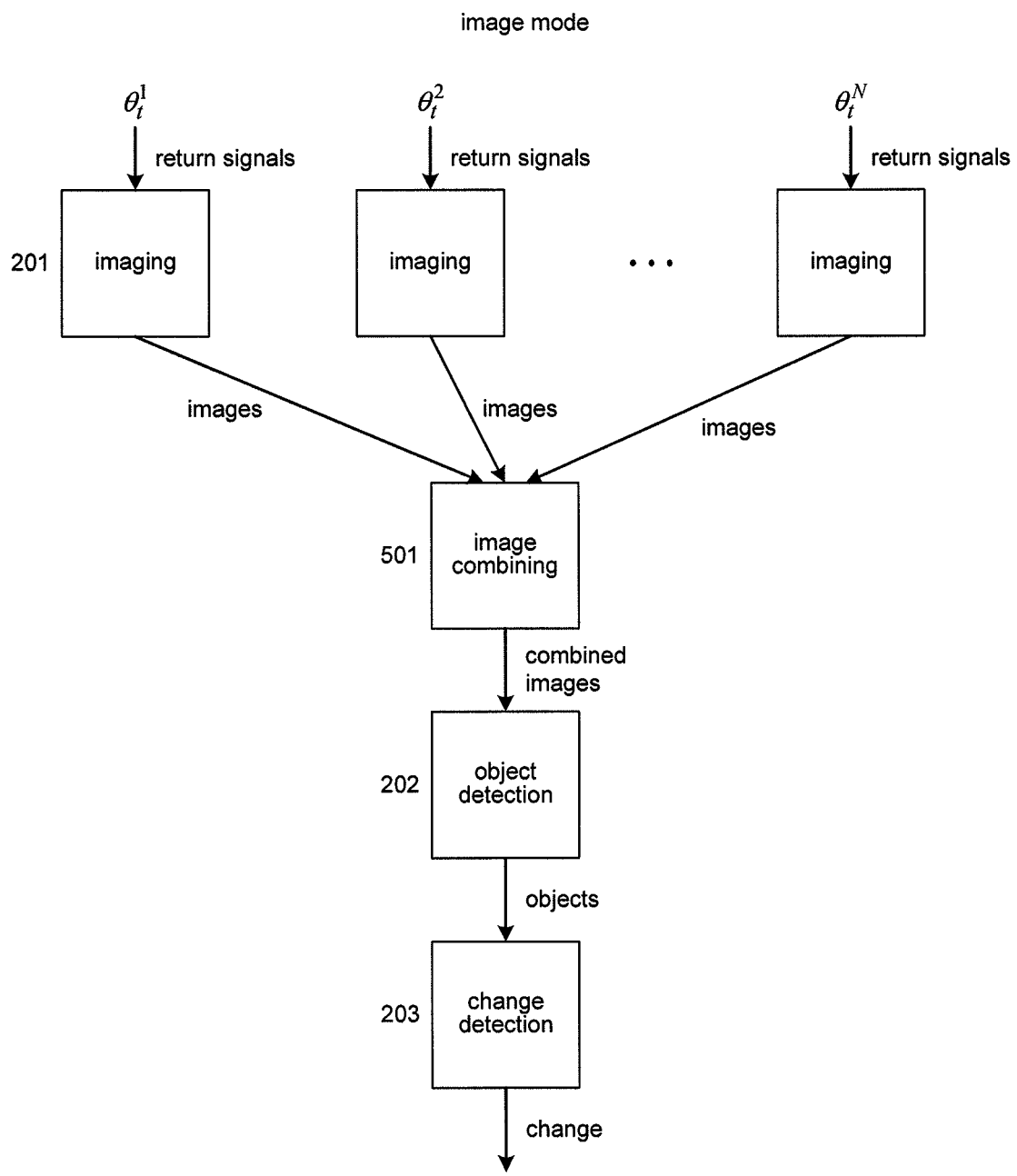
FIG. 5 is a block diagram that illustrates the combined image mode in some embodiments of the polarized detection system.

FIG. 5 is a block diagram that illustrates the combined image mode in some embodiments of the polarized detection system. In combined image mode, the polarized detection system performs separate imaging 201 for each transceiver orientation. For each transceiver orientation $\theta_t$, the polarized detection system receives return signals collected by receivers at orientation $\theta_t$ and outputs images for that transceiver orientation. The polarized detection system performs image combining 501 to combine the images generated for each transceiver orientation at each down-track location into a combined image for that down-track location. The polarized detection system then performs object detection 202 on the combined images and change detection 203 on the objects and outputs an indication of any change.

Figure 6:
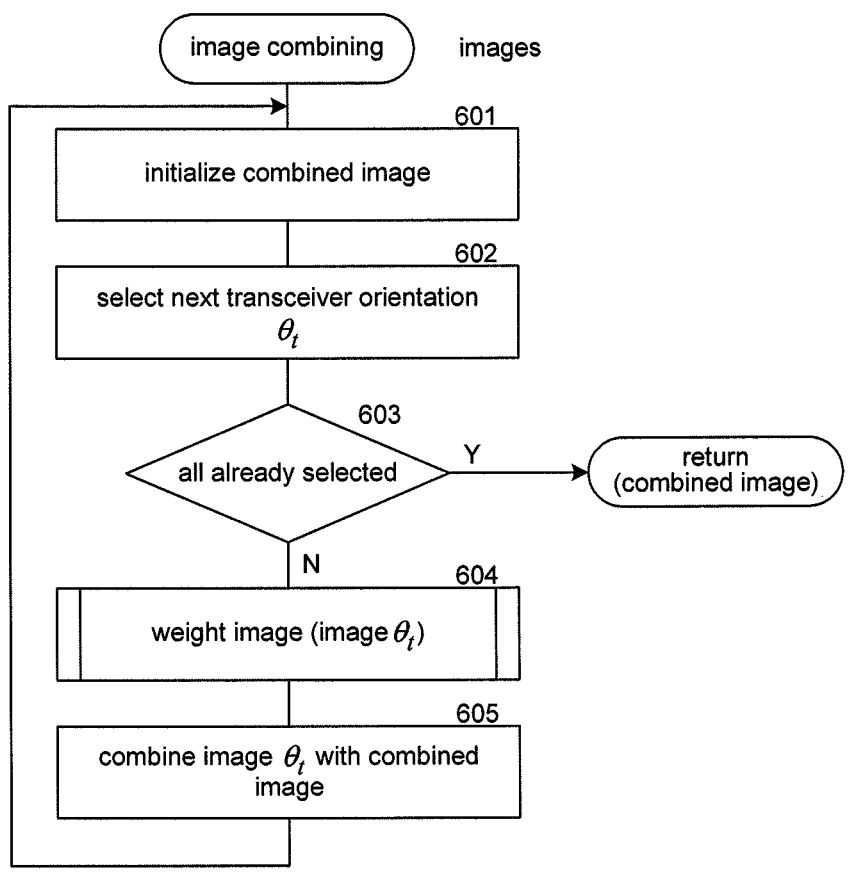
FIG. 6 is a flow diagram that illustrates the processing of an image combining component of the polarized detection system in some embodiments.

FIG. 6 is a flow diagram that illustrates the processing of an image combining component of the polarized detection system in some embodiments. The component is passed an image for each transceiver orientation and outputs a combined image. In block 601, the component initializes the combined image. In block 602, the component selects the next transceiver orientation $\theta_t$. In decision block 603, if all the transceiver orientations have already been selected, then the component completes, else the component continues at block 604. In block 604, the component invokes a weight image component to weight the pixels of the selected image based on the alignment of the object(s) with the transceiver orientation. In block 605, the component combines the weighted image with the combined image and loops to block 602 to select the next transceiver orientation.

Figure 7:
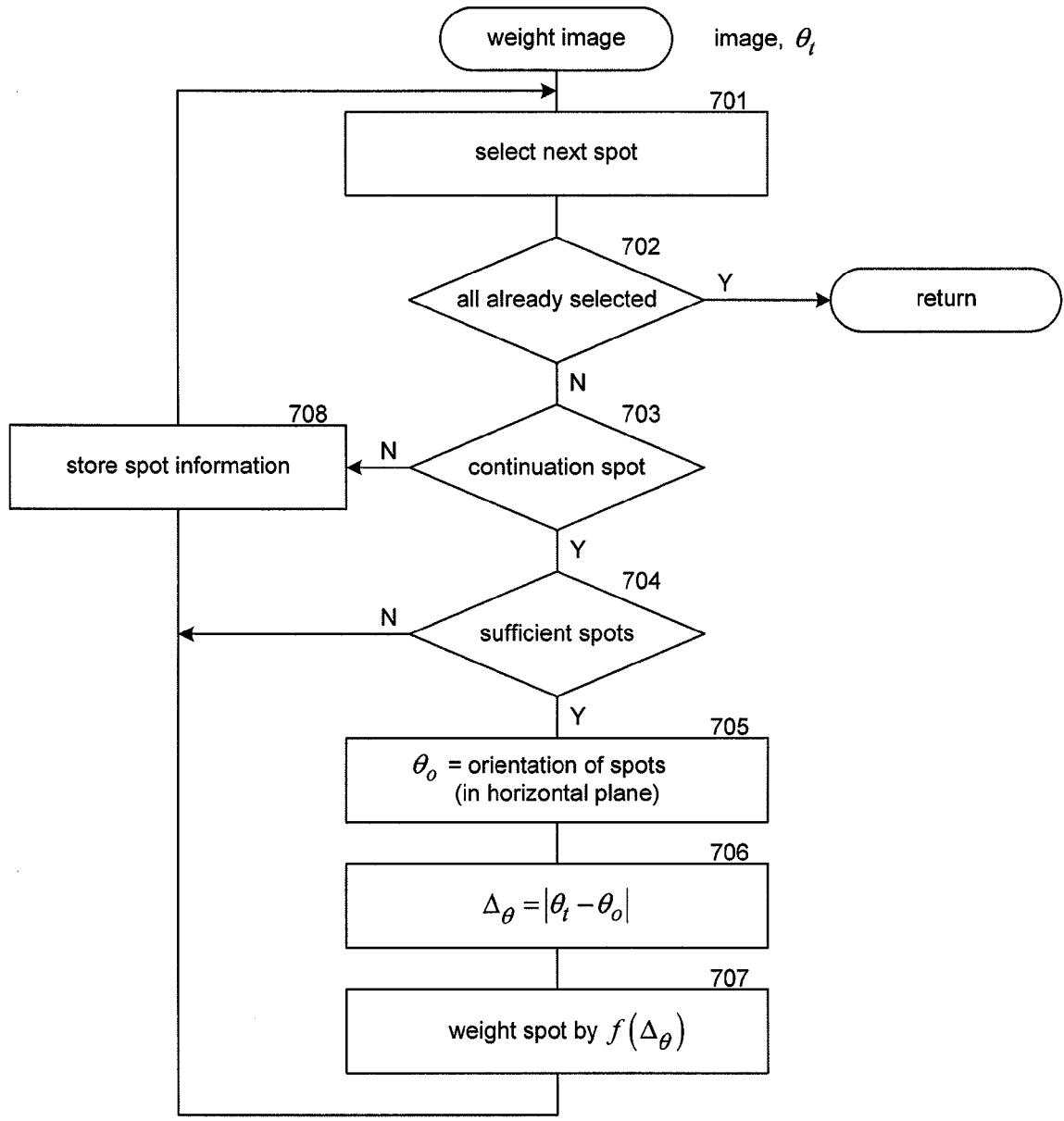
FIG. 7 is a flow diagram that illustrates the processing of a weight image component of the polarized detection system in some embodiments.

FIG. 7 is a flow diagram that illustrates the processing of a weight image component of the polarized detection system in some embodiments. The component is passed an image and the transceiver orientation of that image. Because the images are combined before object detection, the component identifies spots on successive images that represent continuations of the same spot as a possible object and determines the orientation of those continuation spots as an object orientation. The component then weights the pixels of those spots based on alignment with the transceiver orientation. In block 701, the component selects the next spot that has been identified from images for that track location. In decision block 702, if all the spots have already been selected, then the component returns, else the component continues at block 703. In decision block 703, if the spot is a continuation of a spot detected at the previous down-track location, then the component continues at block 704, else the component continues at block 708. In decision block 704, if continuation spots have been detected in a sufficient number of down-track locations, then the component continues at block 705, else the component continues at block 708. In block 705, the component determines the object orientation of the spots as an indication of the object represented by the spots. In block 706, the component determines the difference between the object orientation and the transceiver orientation. In block 707, the component weights the pixels of the spot by the weighting function. In block 708, the component stores the spot information and loops to block 701 to select the next spot.

The computing devices on which the polarized detection system may be implemented may include a central processing unit and memory and may include input devices (e.g., keyboard and pointing devices), output devices (e.g., display devices), and storage devices (e.g., disk drives). Computer-readable media include computer-readable storage media and data transmission media. The computer-readable storage media include memory and other storage devices that may have recorded upon or may be encoded with computer-executable instructions or logic that implement the polarized detection system. The data transmission media is media for transmitting data using signals or carrier waves (e.g., electromagnetism) via a wire or wireless connection. Various functions of the polarized detection system may also be implemented on devices using discrete logic or logic embedded as an application-specific integrated circuit. The polarized detection system may be implemented on a computer system that is local to a vehicle to which a linear array of penetrating radar antennas is mounted for processing the return signals locally. Alternatively, one or more of the components may be implemented on a computer system that is remote from the linear array. In such an alternative, the data used by the various components (e.g., return signals and image frames) may be transmitted between the local computing system and remote computer system and between remote computing systems.

The polarized detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for processing an age of a subsurface of a medium, the method comprising:
    for each of a plurality of transceiver orientations, generating an image based on return signals acquired from signals emitted by one or more transmitters at that transceiver orientation;
    determining an object orientation of an object below the surface of the medium, the object orientation being determined from return signals collected at a plurality of down-track locations of the medium; and
    processing the images factoring in the transceiver orientation used in generating each image relative to the object orientation.

2. The method of claim 1 including assigning a weight to each transceiver orientation based on the transceiver orientation used in generating the image relative to the object orientation.

3. The method of claim 2 wherein the weight for a transceiver orientation is based on a cosine of a difference between that transceiver orientation and the object orientation.

4. The method of claim 2 wherein the processing includes generating a combined image as a combination of the images based on the weights for each transceiver orientation.

5. The method of claim 4 wherein the processing includes detecting objects from the combined images generated from a plurality of down-track locations.

6. The method of claim 5 wherein the processing includes detecting a change in detected objects based on combined images previously generated for the medium.

7. The method of claim 2 wherein the processing includes:
    for each of the plurality of transceiver orientations,
        detecting objects from a plurality of images generated at down-track locations for that transceiver orientation; and
        generating attributes for the detected objects for that transceiver orientation; and
    generating a combined attribute for a detected object from a weighted combination of the attributes for that detected object for the transceiver orientations based on the weights for the transceiver orientations.

8. The method of claim 7 wherein the processing includes detecting a change in detected objects based on the combined attributes for previously detected objects.

9. The method of claim 1 wherein the processing includes:
    for each of the plurality of transceiver orientations,
        detecting objects from a plurality of images generated at down-track locations for that transceiver orientation; and
        detecting a change in detected objects based on images generated for that transceiver orientation; and
    generating a combined indication of a change in a detected object based on the detected change for the plurality of transceiver orientations.

10. The method of claim 9 wherein the combined indication of a change indicates a change in a detected object when a change is detected for at least one of the transceiver orientations.

11. A computer-readable storage medium that is not a transitory, propagating signal storing computer-executable instructions for controlling a computing system to process images of a subsurface of a medium, the computer-executable instructions comprising:
    instructions that, for each of a plurality of down-track locations of the medium,
        for each of a plurality of transceiver orientations at that down-track location, generate an image based on return signals acquired from signals emitted by one or more transmitters at that transceiver orientation;
    instructions that determine an object orientation of an object below the surface of the medium; and
    instructions that process the images factoring in the transceiver orientation used in generating each image relative to the object orientation.

12. The computer-readable storage medium of claim 11 wherein the instructions that process include instructions to generate a combined image as a combination of the images factoring in the transceiver orientation used in generating the images.

13. The computer-readable storage medium of claim 12 wherein the instructions that process include instructions to detect objects from the combined images generated from a plurality of down-track locations.

14. The computer-readable storage medium of claim 13 wherein the instructions that process include instructions to detect a change in detected objects based on combined images previously generated for the medium.

15. The computer-readable storage medium of claim 11 wherein the instructions that process include instructions that,
    for each of the plurality of transceiver orientations,
        detect objects from a plurality of images generated at down-track locations for that transceiver orientation; and
        generate attributes for the detected objects for that transceiver orientation; and generate a combined attribute for a detected object from a weighted combination of the attributes for that detected object for the transceiver orientations based on the weights for the transceiver orientations; and detect a change in detected objects based on the combined attributes for previously detected objects.

16. The computer-readable storage medium of claim 11 wherein the instructions that process include instructions that, for each of the plurality of transceiver orientations, detect objects from a plurality of images generated at down-track locations for that transceiver orientation; and detect a change in detected objects based on images generated for that transceiver orientation; and generate a combined indication of a change in a detected object based on the detected change for the plurality of transceiver orientations.

17. A device for processing images of a subsurface of a medium, the device comprising:

an imaging component that, for each of a plurality of down-track locations of the medium, for each of a plurality of transceiver orientations at that down-track location, generates an image based on return signals acquired from signals emitted by one or more transmitters at that transceiver orientation;

an object detection component that detects objects represented in the generated images factoring in transmitter orientation and object orientation; and a change detection component that detects and indicates changes in the objects detected during previous processing of images.

18. The device of claim 17 including an image combining component that generates a combined image as a combination of the images factoring in the transceiver orientation used in generating the images and object orientations of objects represented in the images.

19. The device of claim 17 including an object combining component that generates a combined object from the objects detected by the object detection component factoring in the transceiver orientation used to generate each image and object orientation.

20. The device of claim 17 including a change combining component that generates a combined indication of changes from the changes indicated by the change detection component for each transceiver orientation.

* * * * *